United States Patent [11] 3,588,684

| [72] | Inventor | John Dwight Ridgeway<br>3517 Admiral Drive, Charleston Heights,<br>S.C. 29405 |
|---|---|---|
| [21] | Appl. No. | 853,018 |
| [22] | Filed | Aug. 26, 1969 |
| [45] | Patented | June 28, 1971 |

[54] PROBE HOLDING ASSEMBLY FOR MAGNETIC TESTING APPARATUS
1 Claim, 8 Drawing Figs.

[52] U.S. Cl. .................................................. 324/38
[51] Int. Cl. ........................................... G01r 33/12
[50] Field of Search .......................................... 324/38, 37
(Cursory); 317/123, 157.5

[56] References Cited
UNITED STATES PATENTS

| 2,481,937 | 9/1949 | Mages | 324/38 |
| 2,644,921 | 7/1953 | Lewkowski, Jr. | 324/38 |
| 2,930,971 | 3/1960 | Taylor | 324/38 |
| 3,300,688 | 1/1967 | Callihan | 317/157.5 |

OTHER REFERENCES

Magnetic Particle Testing of Commercial Forgings; Forging Manufacturers' Assoc., Inc., New York, N.Y. copyright, 1944 (pp.13— 14) (Copy in 324-38)

Primary Examiner—Rudolph V. Rolinec
Assistant Examiner—R. J. Corcoran
Attorneys—Joseph C. Warfield, John W. Pease and Harvey A. David ABSTRACT: Portable magnetic testing apparatus including a low voltage control circuit for energization of a transformer/rectifier circuit for energizing test probes with high amperage direct current. The apparatus includes an adjustable prod holding assembly, and a variety of prods are described.

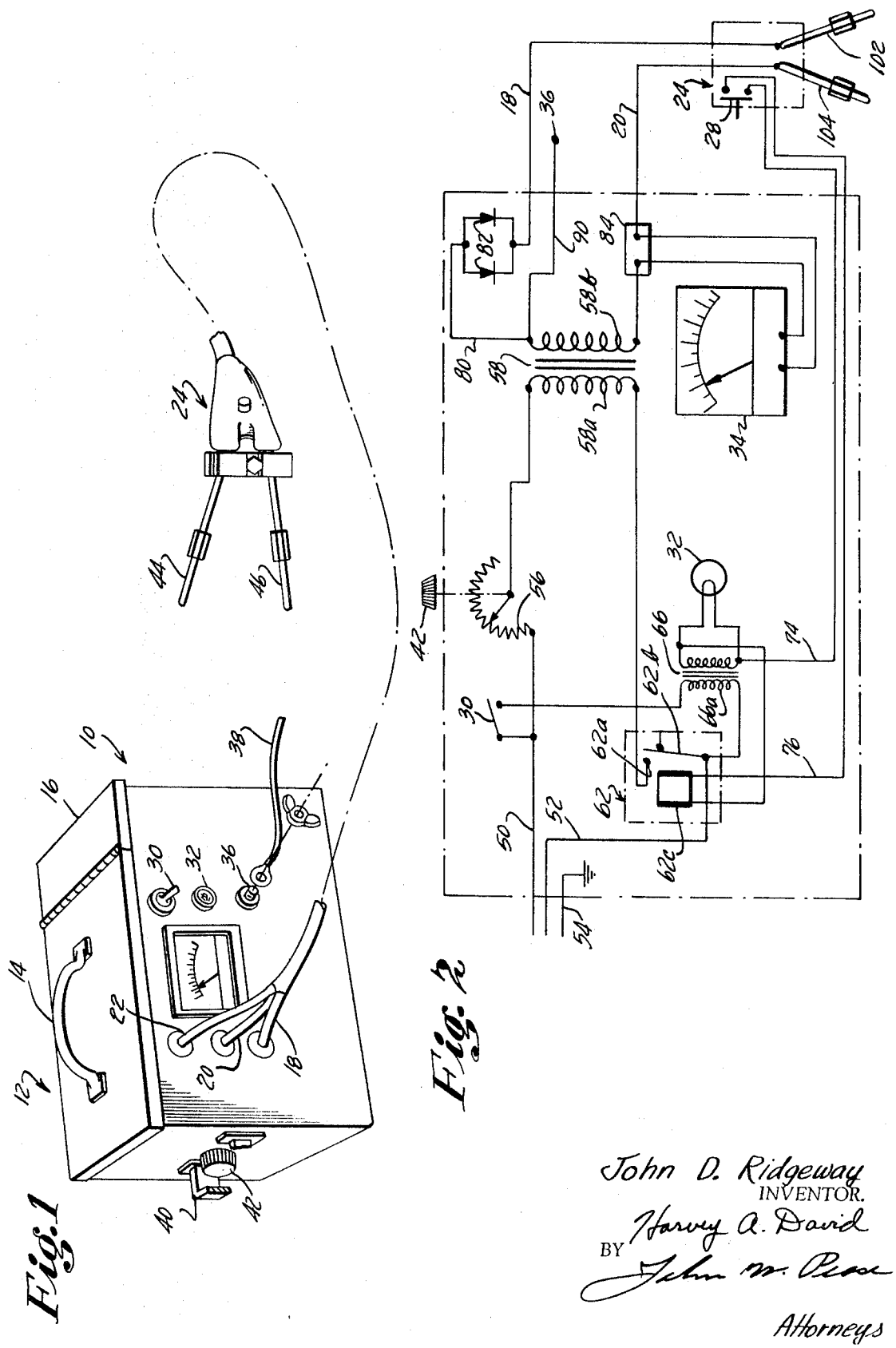

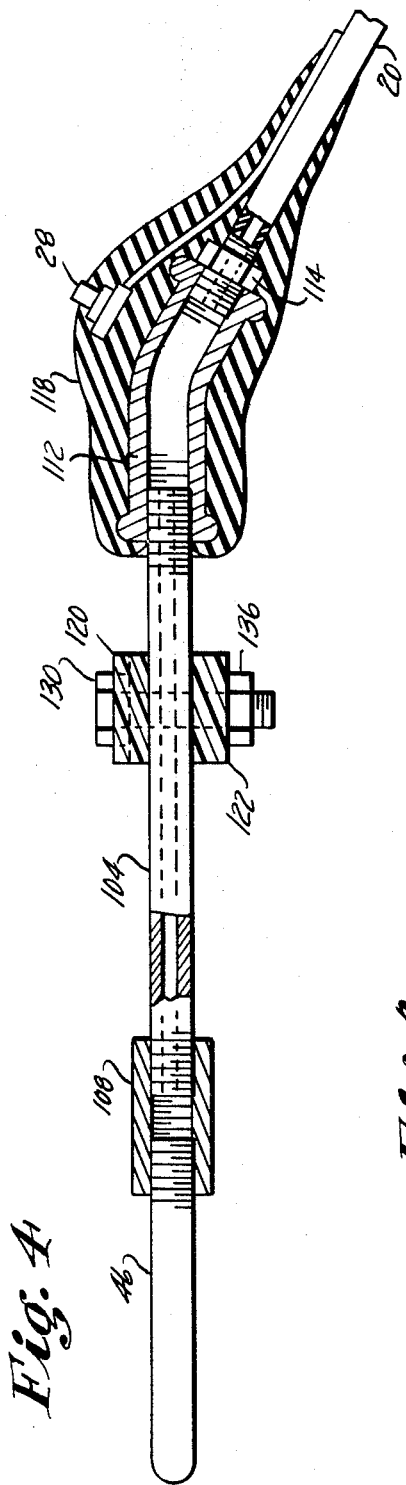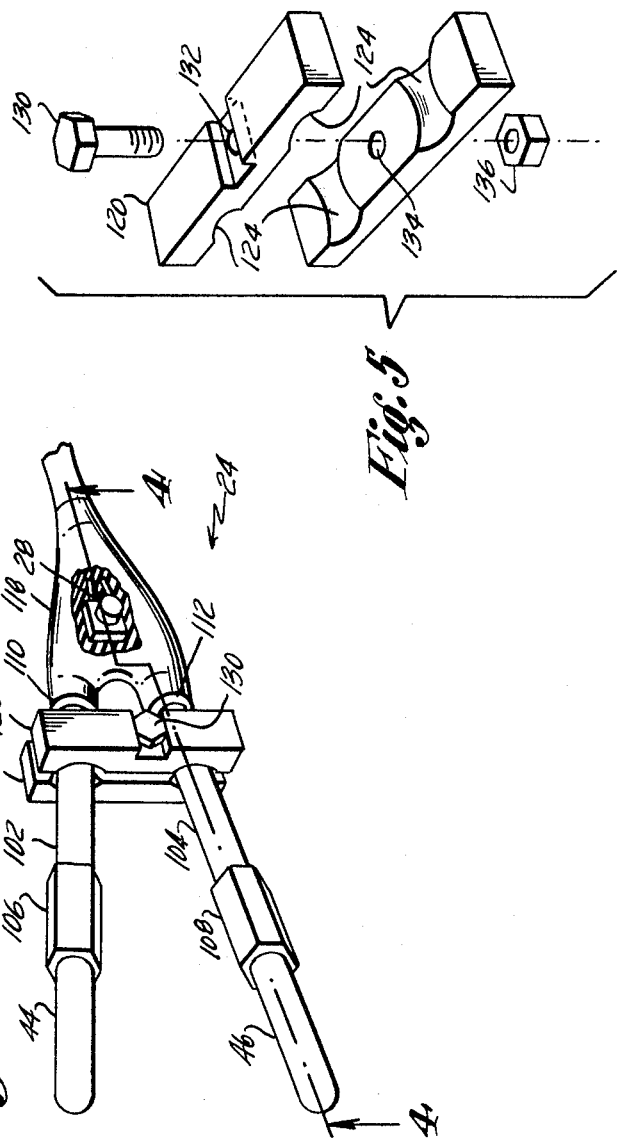

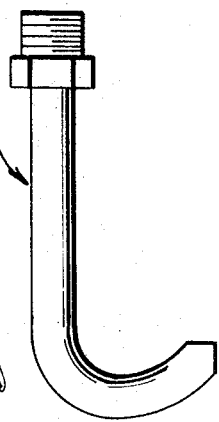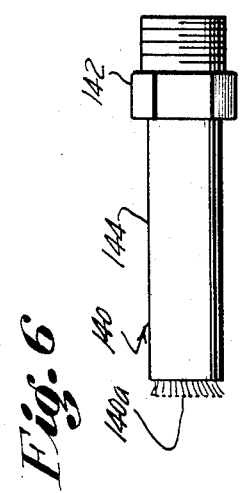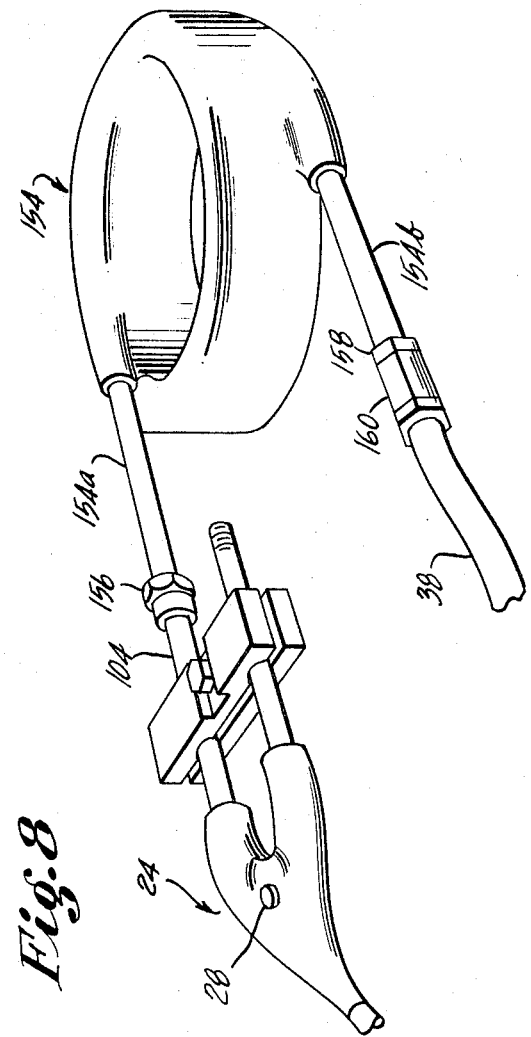

PROBE HOLDING ASSEMBLY FOR MAGNETIC TESTING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the art of testing magnetic materials for cracks, imperfect welds and the like by applying direct current through the portion of the article or structure to be tested and then scattering iron particles thereover to reveal anomalies in the resulting magnetic field which are indicative of cracks or other imperfections. More particularly the invention is directed to improved apparatus for supplying testing currents and for applying them to test pieces or structures.

Apparatus used for this purpose heretofore has been costly, inordinately cumbersome, subject to electrical failure, and has imposed undue risk of injurious shock or electrocution.

BRIEF SUMMARY OF THE INVENTION

With the foregoing in mind it is a primary object of the present invention to provide improved apparatus for use in magnetic testing and which apparatus is characterized by improved versatility, handiness, and reliability as well as safety of the operator.

As another object this invention aims to accomplish the foregoing through the provision of apparatus for use in magnetic testing comprising in combination a transformer and rectifier circuit for energizing probes with direct current at safe voltage, and a low voltage control circuit for controlling energization of the transformer with alternating current at line voltage without risk to the operator.

Still another object of the invention is the provision of apparatus as set forth in the preceding paragraph and comprising a novel probe holding means which permits ready adjustment of probe spacings and also permits selective replacement of probes to suit the workpiece or structure being tested.

BRIEF DESCRIPTION OF THE DRAWINGS

The invention may be further said to reside in certain constructions and arrangements of parts by which the foregoing objects and advantages are achieved as well as others which will become apparent from the following description of a preferred embodiment when read in conjunction with the accompanying sheets of drawings forming a part of this specification, and in which:

FIG. 1 is perspective view of a magnetic testing apparatus embodying the present invention;

FIG. 2 is a diagrammatic illustration of the electrical circuitry of the apparatus of FIG. 1;

FIG. 3 is an illustration partly in elevation and partly in section and on an enlarged scale of a prod holding assembly forming part of the apparatus of FIG. 1;

FIG. 4 is a sectional view taken substantially along lines 4—4 of FIG. 3;

FIG. 5 is an exploded perspective view of clamp means forming part of the prod holding assembly;

FIG. 6 is an elevational view of an alternative form of prod;

FIG. 7 is an elevational view of another alternative form of prod; and

FIG. 8 is a perspective view of a demagnetizing coil shown in association with the prod holding assembly.

DESCRIPTION OF THE PREFERRED EMBODIMENT

In the form of the invention illustrated in the drawings and described hereinafter, there is provided a magnetic testing apparatus, generally indicated at 10. The apparatus 10 comprises a box or housing 12 formed of a nonmagnetic material such as aluminum. The housing 12 is provided with a carrying handle 14 and has a hinged cover portion 16 which can be opened to reveal a convenient storage compartment for certain accessories, later described.

A plurality of electrical cables 18, 20, 22 extend from the front wall of the housing 12, the cables 18 and 20 serving to carry high amperage direct current to and from a prod holding assembly generally indicated at 24. The cable 22 contains two conductors, later referred to, serving to connect a low voltage switch 28 to circuitry within the housing 12. The switch 28 is conveniently mounted on the prod holding assembly 24. Mounted on the front panel of the housing 12 is a line power switch 30, a "power-on" indicator light 32, a DC ammeter 34, and an AC output connection stud 36. A cable 38 may be connected to the stud 36 by a wing nut for a purpose later to be described. Mounted on an end panel, and protected by a guard 40, is a rheostat control knob 42 which may be used to control the amperage of direct current flowing through cables 18, 20 and prod holding assembly 24 to and from prods 44, 46 mounted in the holding assembly.

Referring now to FIG. 2, the circuitry within the housing 12 receives electrical power input via conductors 50, 52 in the form of 100 to 125 volts, 60 cycle, single phase alternating current. A ground wire 54 is preferably associated with the cable containing conductors 50 and 52 and is connected to the housing 12. A circuit may be traced from the conductor 50 through a rheostat 56 which is connected in series with the primary winding 58a of a current transformer 58, and through a conductor 60 to a fixed contact 62a of a control relay 62. A normally open, movable contact 62b of the relay is connected to the conductor 52 and also to a conductor 64.

The conductor 64 is connected to one end of a winding 66a of a relay transformer 66. The other end of the winding 66a is connected by a conductor 68 to one terminal of the single pole single throw switch 30, the other terminal of which is connected to the conductor 50.

The relay transformer 66 has its secondary winding 66b connected to the "power-on" indicating lamp 32 and also to the solenoid 62c of relay 62 by conductor 74, the control switch 28, and a conductor 76. The conductors 74 and 76 are combined into one cable 22 in FIG. 1. When the switch 30 is closed, the primary of relay transformer 66 is energized thereby providing at the secondary thereof current for energizing lamp 32 and for energizing relay 62 upon closing of switch 28.

Energization of relay 62 to close contacts 62a, 62b thereof applies power to the primary 58a of the transformer 58, under the control of the rheostat 56.

The secondary winding 58b of the transformer 58 has one end connected by a conductor 80 to a pair of parallel connected rectifier diodes 82. The diodes 82 are connected by conductor 18 to one element of the prod holder 24. The other element of the prod holder 24 is connected by conductor 20 and a shunt resistor 84 to the other end of secondary winding 58b.

The ammeter 34 is connected across the shunt resistor 84 and is calibrated to read 0—500 amps through the shunt resistor.

The AC connector 36 is connected via a conductor 90 to the end of the transformer secondary winding 58b which is connected to the diodes 82.

When the transformer 58 is energized as described above, the action of the diodes 82 is to render half wave rectified current available across prods 44, 46 in the prod holding assembly 24.

Referring now to FIGS. 3, 4 and 5, the prod holding assembly 24 comprises first and second elongated elements 102 and 104 which are conveniently in the form of thick walled brass pipe nipples. At the distal ends of the elements 102 and 104 are prod receiving threaded sockets 106, 108, conveniently in the form of brass pipe couplings threaded onto the pipe nipples.

The proximal ends of the elements 102, 104 are provided with cable receiving threaded sockets 110, 112, conveniently in the form of 45 brass pipe elbows. The ends of the cables 18 and 20 are soldered into threaded bushings 114 which are threadedly received in the sockets 110, 112, one such bushing being shown in FIG. 4.

The cable receiving sockets 110, 112 of the holding assembly are held in spaced relation to one another by an encasement 118 of a resilient material such as molded rubber or the like. Additionally, the switch 28 is conveniently held in place adjacent the sockets 110, 112 by the encasement 118.

The elongated elements 102, 104 are adjustably secured together in divergent, spaced relation by clamping means in the form of two blocks 120, 122 of rigid insulating material such as "Melamine" plastic. As is best illustrated in FIG. 5, the blocks 120, 122 have shallow grooves 124 defined therein. The grooves 124 of the block 120 cooperate with those of the block 122 to receive the elements 102, 104 when the blocks are assembled with a clamping screw 130 extending through aligned openings 132, 134 in the blocks. A nut 136 on the screw 130 permits the blocks to be loosened and moved toward or away from the prod receiving sockets 106, 108, thereby causing the prods in the elements 102, 104 to be drawn closer together or spread farther apart. The resilient encasement 118 permits this adjustment to be made without the need of any complicated pivot joints or the like. The adjustments so made permit the prods 44, 46 to work pieces at desired points of current application.

The prods 44, 46 are formed of mild steel. However, for testing certain materials and structures it is sometimes desireable to replace the prods 44, 46 with prods of different shape and/or construction. Thus, FIG. 6 illustrates a soft prod 140 comprising a bushing 142 at one end in which is soldered a short length of cable having many strands of copper wire contained in an insulating covering 144 for most of their length, the wires being spread and turned back at the end portion 140a. This type of prod is particularly useful where a structure to be tested has a surface which is prone to damage from scratching and/or arcing when contacted by steel prods.

One or both of the steel prods 44, 46 may be replaced by hook prods such as that shown at 150 in FIG. 7, the hook prod 150 being particularly useful when testing a structure having surfaces difficult to reach with a straight prod.

At times it is desirable to demagnetize a work piece after testing. This can readily be accomplished through the agency of a demagnetizing coil 154 illustrated in FIG. 8.

The coil 154 comprises a coil of three turns of heavy, insulated electrical cable, the coil having one lead portion 154a terminating in a pipe type universal joint 156, and having another lead portion 154b terminating in a threaded bushing 158.

To use the coil 154, the sockets 106, 108 are removed from the prod holding assembly 24 and the universal joint 156 is connected to the element 104. The cable 38 may then have one end connected to the bushing 158 by means of a coupling 160, and have its other end connected to the stud 36. The coil 154 is then energized by actuating the switch 28 and the part to be demagnetized is passed through the coil.

If it is desired to magnetize a workpiece using the coil 154, the end 154b thereof is connected to the element 102 rather than to the cable 38. This will provide a DC flow through the coil when the switch 28 is actuated.

The cable 38, various prods, coil 154, and other items useful in the type of testing concerned may be stored when not in use in the portion of the housing 12 under the hinged cover 16.

In addition to forming the housing 12 of nonmagnetic material to avoid clinging of iron particles, it is desirable to seal all seams of the housing, for example with a silicone rubber compound. This prevents entry of iron particles to the interior of the housing where they would create a likelihood of short circuitry.

I claim:

1. A probe holding assembly for use with magnetic testing apparatus, said assembly comprising:

first and second elongated, conductive elements each having proximate and distal ends;

first and second cables connected to the proximate ends of said first and second conductive elements, respectively;

first and second probes threadedly connected to the distal ends of said first and second conductive elements, respectively;

resiliently flexible molded insulating means encasing the proximate end portions of said first and second conductive elements and holding the proximate ends of said first and second conductive elements in spaced relation while permitting said elements and the probes connected thereto be moved relative to one another between positions of varying divergence;

clamp means comprising first and second rectangular blocks of rigid insulating material, each having first and second grooves defined therein, said grooves being spaced a distance apart greater than the space between said proximate ends, and screw means extending through said blocks between the grooves thereof and securing said blocks with the respective first and second grooves thereof in opposing relation;

said first and second elongated conductive elements being received in said first and second grooves, respectively, and releasably clamped by said blocks; and said blocks being movable between selected clamped positions along said conductive elements to vary the divergence thereof and of the probes connected thereto.